(No Model.)

A. SCHMITZ.
MANUFACTURE OF ICE AND APPARATUS THEREFOR.

No. 328,523. Patented Oct. 20, 1885.

Attest
W. J. Boulter
Paul M. Knobloch

Inventor
Albert Schmitz,
per Henry Orth
his atty.

UNITED STATES PATENT OFFICE.

ALBERT SCHMITZ, OF ESSEN-ON-THE-RUHE, ASSIGNOR TO WILHELM RAYDT, OF HANOVER, PRUSSIA, GERMANY.

MANUFACTURE OF ICE AND APPARATUS THEREFOR.

SPECIFICATION forming part of Letters Patent No. 328,523, dated October 20, 1885.

Application filed May 29, 1885. Serial No. 167,050. (No model.) Patented in England March 14, 1885, No. 3,347; in Belgium March 14, 1885, No. 68,193; in Italy May 4, 1885, XXXVI, 86, and in Austria-Hungary May 29, 1885, No. 10,500 and No. 27,121.

*To all whom it may concern:*

Be it known that I, ALBERT SCHMITZ, engineer, a subject of the King of Prussia, residing at Essen-on-the-Ruhe, Germany, have invented certain new and useful Improvements in the Manufacture of Ice and Apparatus therefor; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to utilize the spent cooling-water in ice-machines for the purpose of lowering the temperature of the water to be frozen; and it consists, essentially, in utilizing the spent cooling-water for the production of cold by the combination, with the freezing cell or chamber, or the tank from which said chamber is fed, of an injector fed and operated by the spent cooling-water to lower the temperature of the water to be frozen by rarefaction of the air in the vessel in which said water to be frozen is contained, whereby the spent cooling-water is advantageously utilized in the manufacture of ice, and the use of complicated air-exhausting apparatus dispensed with.

The injector supplied with cooling-water may be connected either with the receiver for the water fed to the freezing-cells of the ice-machine, or with the cells themselves.

Figure 1:
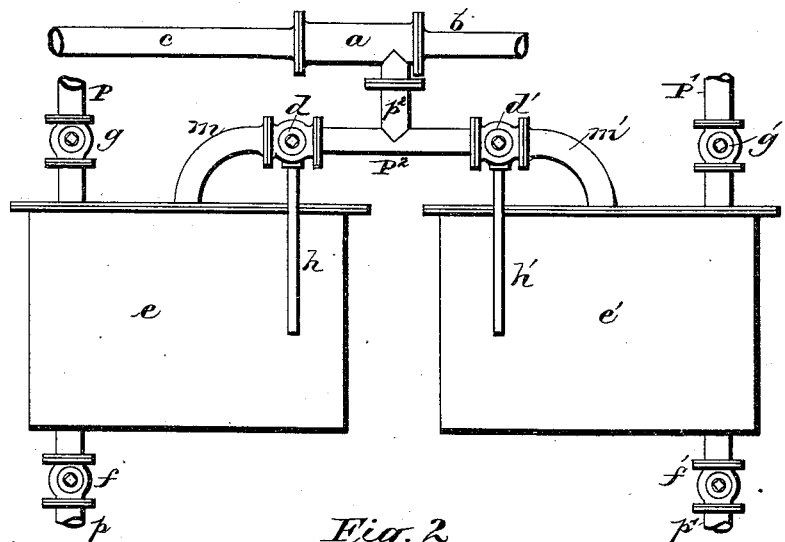
Figure 2:
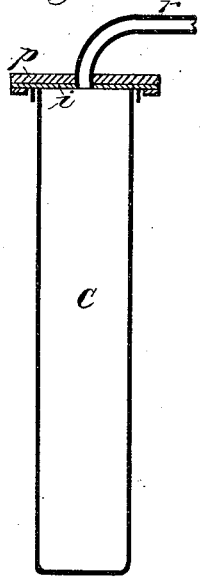

In the accompanying drawings, Figure 1 shows my invention as carried out in its application to the tanks from which the water to be frozen is fed to the freezing-cells. Fig. 2 is a section of a freezing-cell constructed for connection with the injector.

$e$ $e'$ indicate two closed tanks or receivers, from which the freezing-cells are alternately fed by connection with pipes $p$ $p'$, provided with stop-cocks $f$ $f'$. Each vessel or tank has a feed-pipe, P P', each provided with a stop-cock, $g$ and $g'$, and by means of pipes $m$ $m'$, pipe $P^2$, and connection $p^2$ the said tanks are connected with any suitable injector, $a$, fed with cooling-water through pipe $b$, which water, after leaving the injector, passes to the condenser through pipe $c$.

Pipe P has two three-way cocks, $d$ and $d'$, to which are connected the pipes $m$ $m'$ of tanks $e$ $e'$, respectively, and with said three-way cocks are connected pipes $h$ and $h'$, respectively, by means of which the tanks $e$ $e'$ are placed in communication with the outer air.

When one of the tanks—say that $e$, for instance—is to be filled, the stop-cock $f$ is closed, and the three-way cock $d$ so set as to place the interior of the vessel in communication with the outer air through pipe $h$. The stop-cock $g$ is opened and water is admitted to tank $e$, the air therein escaping through pipe $h$, and by means of which latter it may also be determined when the tank is full. When the latter has been effected, the stop-cock $g$ is closed and the three-way cock set to close the communication with the outer air through pipe $h$ and establish communication with the injector. After the air has been exhausted from tank $e$ and tank $e'$ emptied, the water in tank $e$ may be fed to the freezing-cells by opening stop-cock $f$ and setting stop $d$ so as to cut off communication with the injector and establish communication, through pipe $h$, with the outer air, and tank $e'$ is now filled, and so on alternately.

It is obvious that a single tank may be employed; but for continuous operation two tanks become absolutely necessary, and this number may be increased indefinitely, according to the capacity of the machine.

The injector, instead of being connected with the feed-tank to lower the temperature of the feed-water by producing a partial vacuum in said tank, may be connected with the freezing-cells themselves. In the latter case the cells are provided with a cover, $p$, to which is secured an elastic packing or lining, $i$. The cover has a branch pipe, $r$, for connecting the cell C with the injector $a$. As soon as the injector commences to work to draw air from the cell the lid or cover $p$ will be drawn tight to its seat and form an air-tight joint by means of the elastic packing. The branch pipe or connection $r$ in practice is preferably a flexible one to facilitate the manipulation.

I claim—

In the manufacture of ice, utilizing the spent cooling-water for the production of cold by the combination, with the freezing cell or chamber, or the tank from which said chamber is fed, of an injector fed and operated by the spent cooling-water to lower the temperature of the water to be frozen by rarefaction of the air in the vessel in which the water to be frozen is contained, substantially as described.

In testimony whereof I affix my signature in presence of two witnesses.

ALBERT SCHMITZ.

Witnesses:
HEINRICH LIPPERT,
HERMANN KUHFUS.